United States Patent [19]
Öhlert et al.

[11] Patent Number: 6,102,434
[45] Date of Patent: Aug. 15, 2000

[54] MOUNTING ASSEMBLY FOR A VEHICULAR SIDE IMPACT GAS BAG MODULE

[75] Inventors: Franz Öhlert, Aalen-Wasseralfingen; Hans-Joachim Tietze, Heubach, both of Germany

[73] Assignee: TRW Occupant Restraint Systems GmbH & Co. KG, Alfdorf, Germany

[21] Appl. No.: 09/287,799

[22] Filed: Apr. 7, 1999

[30] Foreign Application Priority Data

Apr. 8, 1998 [DE] Germany .................... 298 06 503 U

[51] Int. Cl.[7] .................................................. B60R 21/20
[52] U.S. Cl. ................................. 280/728.2; 280/730.2
[58] Field of Search ............................ 280/728.2, 730.2

[56] References Cited

U.S. PATENT DOCUMENTS

| | | | |
|---|---|---|---|
| 5,265,903 | 11/1993 | Kuretake et al. | 280/730.2 |
| 5,755,457 | 5/1998 | Specht | 280/728.2 |
| 5,791,683 | 8/1998 | Shibata et al. | 280/730.2 |
| 5,899,486 | 5/1999 | Ibe | 280/728.2 |
| 5,921,575 | 7/1999 | Kretschmer et al. | 280/728.2 |

*Primary Examiner*—Kenneth R. Rice
*Attorney, Agent, or Firm*—Tarolli, Sundheim, Covell, Tummino & Szabo L.L.P.

[57] ABSTRACT

A mounting assembly for a lateral impact gas bag module comprises a fastening section and a mounting section. The fastening section is provided with at least one opening for a fastener stud. The mounting section comprises two side walls facing each other, and a transition section connecting the side walls to each other. At least one locking edge is provided in at least one of the side walls. This locking edge serves to lock a gas bag module in place in the mounting section.

4 Claims, 2 Drawing Sheets

MOUNTING ASSEMBLY FOR A VEHICULAR SIDE IMPACT GAS BAG MODULE

The invention relates to a mounting assembly for a vehicular side impact gas bag module.

BACKGROUND OF THE INVENTION

In most cases, a side impact gas bag module extends along the outer edge of the vehicle roof in the transition portion to the vehicle doors. Usually, screws are used to secure the gas bag module, which are directly screwed into suitable openings configured in the roof pillar of the vehicle. The disadvantage in this arrangement is that specific tolerances need to be maintained so that the screws extending through openings in the gas bag module can also be screwed into the assigned openings in the roof pillar.

BRIEF DESCRIPTION OF THE INVENTION

The invention provides a mounting assembly for a side impact gas bag module in which the expenses involved in installation and the requirements on the tolerances to be maintained are reduced. A gas bag mounting assembly according to the invention comprises a fastening section and a mounting section. The fastening section is provided with at least one opening for a fastener stud. The mounting section comprises two side walls facing each other, and a transition section connecting the side walls to each other. At least one locking edge is provided in at least one of the side walls. This locking edge serves to lock a gas bag module in place in the mounting section. The mounting assembly can be bolted to the roof pillar of the vehicle with suitable interspaces without there being any need for specific tolerances to be maintained since the spacing of the mounting assemblies to each other may vary within given limits. The side impact gas bag module is then simply inserted into the mounting assembly, it being automatically locked in place by the locking edge.

BRIEF DESCRIPTION OF THE DRAWINGS

Advantageous embodiments of the invention read from the sub-claims.

The invention will now be described with respect to various embodiments as evident from the drawings in which.

DETAILED DESCRIPTION OF THE INVENTION

Figure 1:
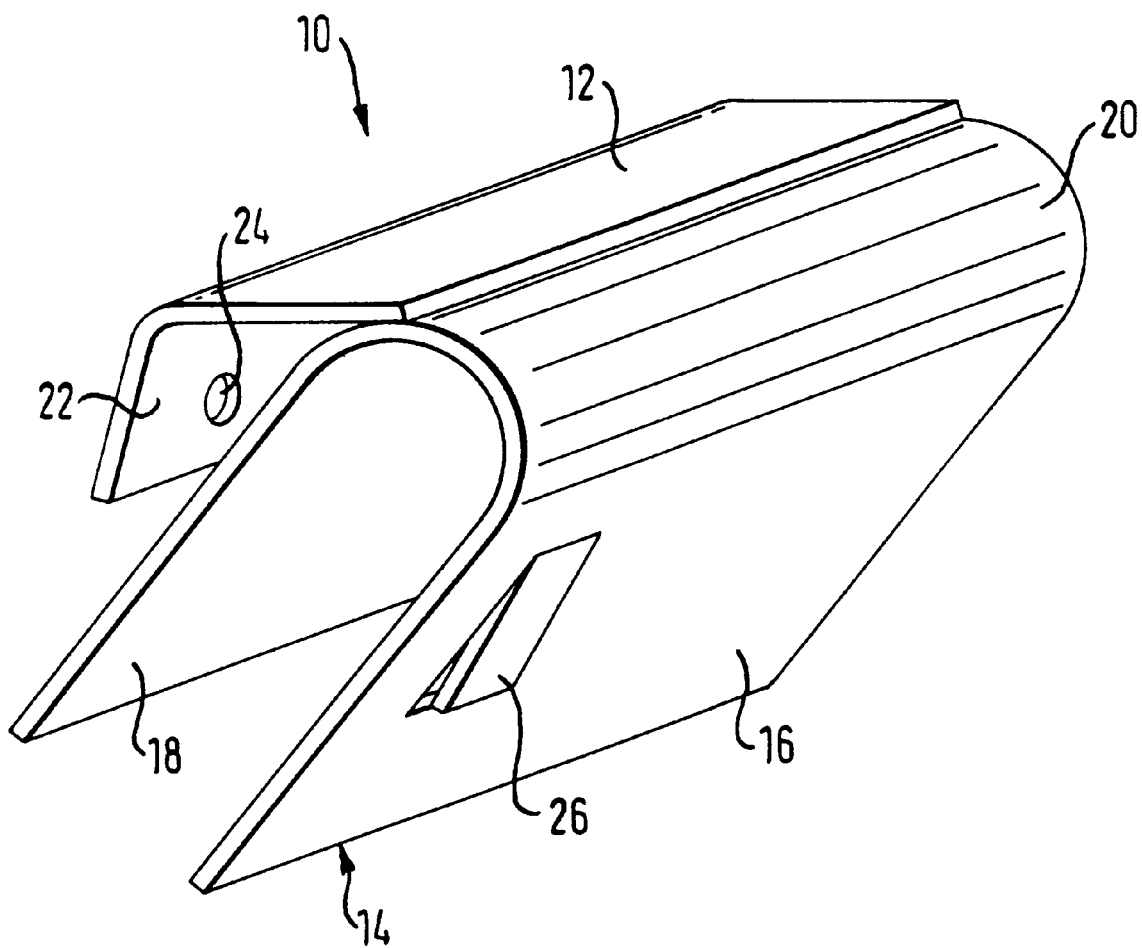
FIG. 1 is a perspective view of a mounting assembly in accordance with a first embodiment of the invention.
Figure 2:
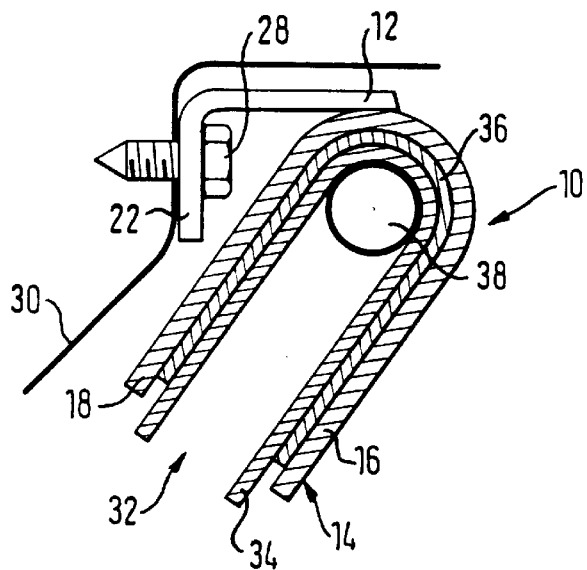
FIG. 2 is a cross-sectional view of the mounting assembly as shown in FIG. 1.

Referring now to FIGS. 1 and 2, the mounting assembly 10 illustrated therein comprises a fastening section 12 and a mounting section 14. The mounting section 14 comprises two side walls 16, 18 facing each other in parallel. The two side walls 16, 18 are connected to each other by means of a transition section 20. The transition section 20 is uniformly curved, it featuring a semicircular profile in a cross-section perpendicular to the axis of curvature.

The fastening section 12 is connected to the mounting section 14 in the region of the transition section 20 of the mounting section. The fastening section 12 is provided with a bent-down section 22 in which several openings 24 are incorporated for a fastener stud, only one opening 24 being evident from FIG. 1.

Formed in the side walls 16 is a rectangular strap 26 by it being cut out on three sides from the material of the side walls 16. The strap 26 is bent out of the side wall 16 so that a locking edge (not shown in FIG. 1) is formed located in the window formed opposite the side at which the strap 26 is connected to the side wall 18.

Referring now to FIG. 2 it is evident that the mounting assembly is affixed by means of a fastening screw 28 to the roof pillar 30 of a vehicle. Inserted into the mounting section 14 is a side impact gas bag module 32 comprising an ejection channel 34, a mounting plate 36 and a gas lance 38. The mounting plate 36 is provided with noses (not visible in FIG. 2) which lock in place in the window formed by means of the strap 26 of the side walls 16 and prevent the gas bag module from being pulled out of the mounting section 14 by resting against the locking edge formed, thus enabling the side impact gas bag module to be reliably secured to the vehicle with minimum effort.

Figure 3:
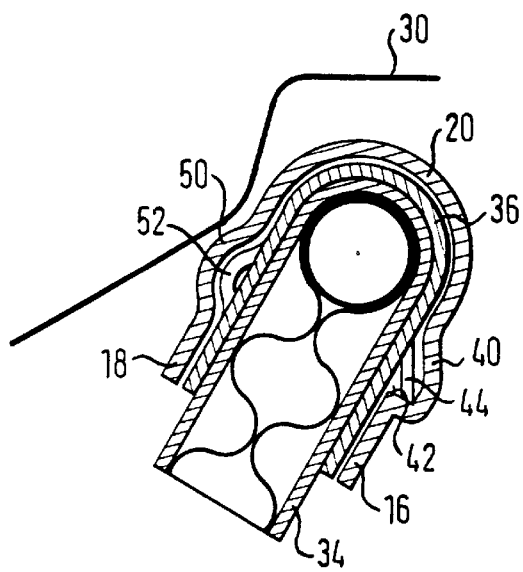
FIG. 3 is a cross-sectional view of a mounting assembly in a second embodiment.

Referring now to FIG. 3 there is illustrated a second embodiment of a mounting assembly in accordance with the invention. In this embodiment no strap is stamped out of the side walls 16, instead merely an indentation 40 being formed to produce the locking edge 42 at its side facing away from the transition section 20. Adjoining the locking edge 42 is a spring nose 44 of the mounting plate 36 of the gas bag module.

In addition, the mounting assembly is provided opposite the indentation 40 with a depression 50 in the side wall 18, in which depression a nose 52 engages, formed on the mounting plate 36 of the gas bag module and serving to secure the gas bag module in the mounting assembly more reliably.

Figure 4:
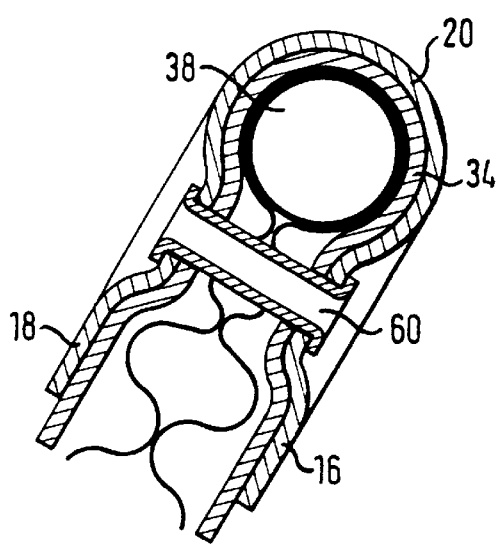
FIG. 4 is a cross-sectional view of a mounting assembly in a third embodiment.

Referring now to FIG. 4 there is illustrated a third embodiment of the invention which unlike the previous embodiment additionally makes use of a rivet 60 extending through corresponding openings of the side walls 16, 18 of the mounting section and the ejection channel 34. The rivet 60 serves to secure the side impact gas bag module even more reliably in the mounting section.

What is claimed is:

1. A mounting assembly for a vehicular side impact gas bag module, comprising a fastening section and a mounting section, said fastening section being provided with at least one opening for a fastener stud, said mounting section comprising two side walls facing each other and a transition section connecting said side walls to each other, at least one locking edge being provided in at least one of said side walls serving to lock a gas bag module in place in said mounting section.

2. The mounting assembly of claim 1, wherein said transition section has a uniformly curved profile.

3. The mounting assembly of claim 1, wherein said fastening section and said mounting section are made of sheet metal.

4. The mounting assembly of claim 1, wherein said locking edge consists of a stamped edge by which a strap is formed, said strap being bent out of a plane defined by said side wall.

* * * * *